United States Patent Office 3,468,644
Patented Sept. 23, 1969

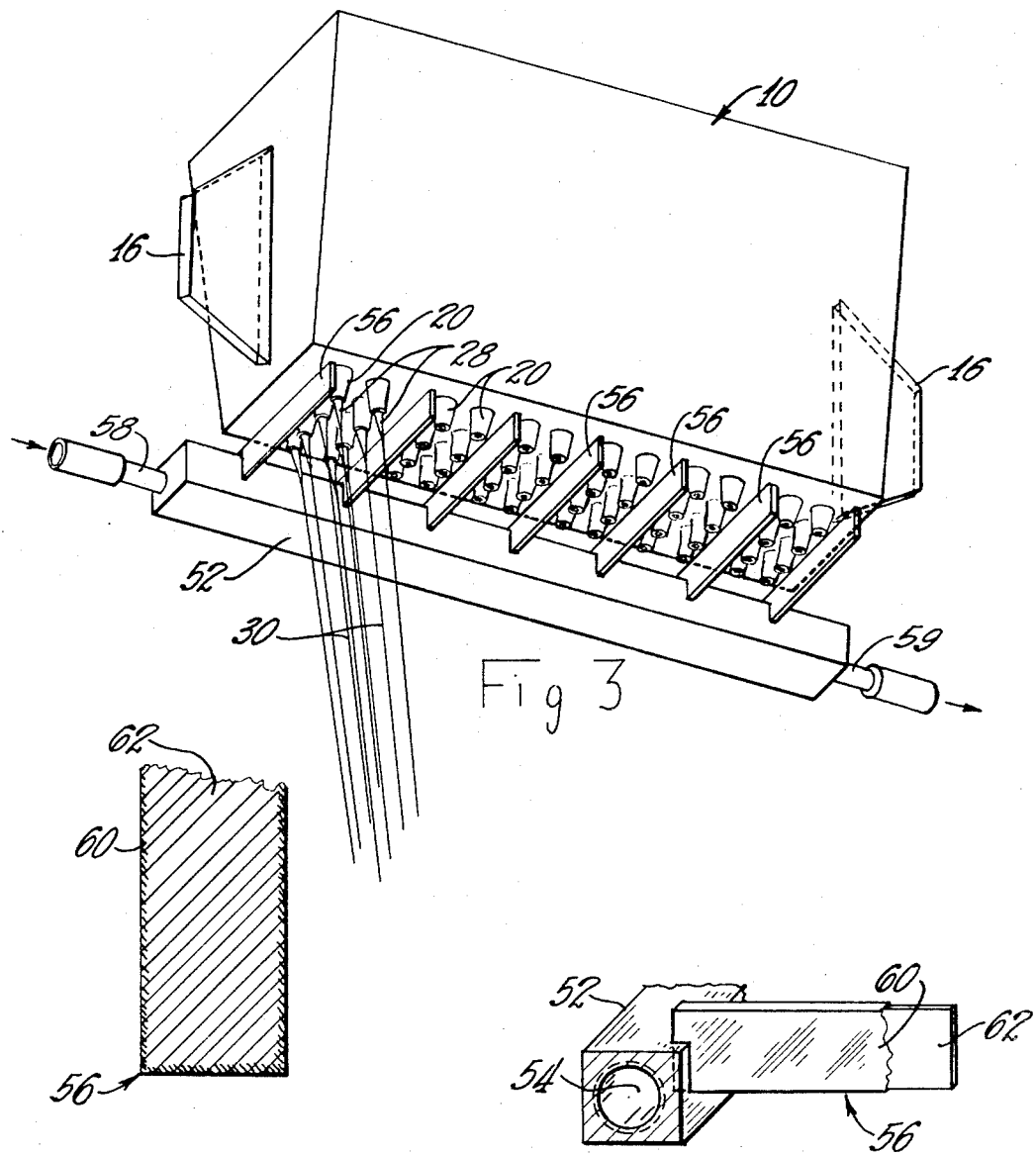

3,468,644
APPARATUS FOR THE PRODUCTION OF GLASS FIBERS
Harold E. Leaman, Newark, Ohio, assignor to Owens-Corning Fiberglas Corporation, a corporation of Delaware
Filed Sept. 28, 1966, Ser. No. 582,602
Int. Cl. C03b *25/04;* C03c *25/00*
U.S. Cl. 65—12                                     10 Claims

ABSTRACT OF THE DISCLOSURE

The disclosure embraces an apparatus for the production of continuous glass filaments attenuated from streams of glass flowing through orifices in a stream feeder wherein elongate members or fins of nonferrous metal disposed in heat-transferring relation with the streams are coated with a metal having a lower rate of heat conductivity than that of the metal of the elongate members or fins.

---

This invention relates to apparatus for the production of glass fibers and more especially to apparatus for producing continuous fibers or filaments attenuated from streams of glass delivered from a stream feeder or bushing.

It has been a commercial practice in producing continuous glass fibers or filaments to flow streams of glass from orificed projections depending from a stream feeder containing a supply of heat-softened glass and attenuate the streams to comparatively fine continuous filaments or fibers particularly for textile uses. The glass in the stream feeder or bushing is electrically heated and the temperature controlled to maintain the glass adjacent the orifices of comparatively low viscosity to promote the flow of streams of glass of substantially uniform size for attenuation to filaments of substantially uniform size. The comparatively low viscosity glass emitted from the orifices is too liquidus to be successfully attenuated into continuous fibers or filaments.

Means have been provided for continuously removing heat from the cones of glass of the streams adjacent the orifices to increase the viscosity of the glass of the cones to enable successful attenuation of the glass to filaments. To attain this objective it has been a practice to provide cone shields or fin shields of metal disposed adjacent the cones of glass to absorb and convey away heat from the cones of glass to rapidly cool the glass of the streams as well as to stabilize the environment by isolating the cones of glass from atmospheric air currents and thereby promote successful attenuation of the streams to filaments. Metal fin shields or cone shields have been used associated with a manifold accommodated heat-absorbing fluid such as water for transferring or removing heat from the cones of glass. The patent to Russell 2,908,036 discloses and describes the use of cone shields or fin shields for cooling the cones of glass.

Metals that have been more extensively used for cone shields or fin shields are copper or silver as these metals have good thermal conductivity and provide for effective absorption and dissipation of the heat from the cones of glass. In filament forming operations wherein a comparatively small number of streams are delivered from a feeder, the orificed projections may be spaced sufficiently to accommodate fin shields with a minimum of liability of the fin shields contacting or engaging the projections. The trend in forming textile strands is to increase substantially the number of filaments in a strand as well as to attain finer filaments.

With an increased number of filaments the number of streams of glass delivered from a feeder is proportionately increased necessitating positioning of the orificed projections in closely spaced relation, an orientation which reduces the available space for the accommodation of fin shields disposed between adjacent rows of streams. In such orientation, the liability of the fin shields to contact the projections is greatly increased. A stream feeder or bushing is usually fashioned of an alloy of platinum and rhodium to withstand the high temperature of the glass and contact of copper or silver with the intensely hot platinum alloy contaminates or erodes the platinum. Another difficulty encountered in the use of fin shields is that volatiles given off by the hot glass of the streams collect and adhere tenaciously to the copper or silver fin shields particularly as the surface of the copper or silver oxidizes at high temperatures, necessitating frequent cleaning of the fin shields. In a fin cleaning operation, the operator removes the assembly of fins and reduces the temperature of the stream feeder to an extent that the streams continue to flow at a comparatively slow rate under the influence of gravity. The operator cleans the removed fin and manifold assembly by washing and brushing which is a laborious and time consuming operation. The operator then repositions the cleaned fin shield assembly adjacent the heated bushing or stream feeder, this operation being very critical, requiring the utmost skill as the assembly must be repositioned without engaging any of the fin shields with the hot projections on the feeder.

In the event of contact of a fin shield with a projection, the copper or silver fin shield contaminates and damages the hot platinum. Where copper or silver fin shields are used, the volatiles accumulate on the shields in a comparatively short time, necessitating frequent cleaning and consequent interruption of the attenuation.

The present invention embraces the provision of a fin shield construction wherein a substrate metal fin shield is fashioned with a surface layer or coating of a metal which on contact with a heated feeder or bushing fashioned of platinum alloy does not contaminate the platinum alloy or damage the feeder or bushing.

Another object of the invention resides in the provision of a fin shield provided with a coating, layer or plating of a metal which is relatively innocuous to platinum or platinum alloy at high temperatures.

Another object of the invention is the provision of a fin shield fashioned with a substrate metal having high thermal conductivity characteristics, the substrate metal provided with a layer or coating of a dissimilar metal having the characteristic that volatiles from hot glass do not readily adhere to the metal of the layer or coating and accumulation of volatiles retarded whereby the fin shield requires cleaning only after long periods of use.

Another object of the invention resides in the provision of a metal fin shield or cone shield embraced by or plated with a dissimilar metal having the characteristic that the volatiles from the glass collecting on the fin shield are not tenaciously adhered thereto, the collected matter being of a character which may be readily washed from the fin shield by a stream of water without displacing or dislodging the fin shield assembly from its position adjacent a feeder or bushing whereby the time required for a cleaning operation is greatly reduced.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 3 is an isometric view of the stream feeder and cone shield arrangement;

FIGURE 4 is a greatly enlarged isometric view of a cone shield and manifold mounting, and FIGURE 5 is a greatly enlarged fragmentary sectional view of one of the cone shields.

Figures 1, 2:
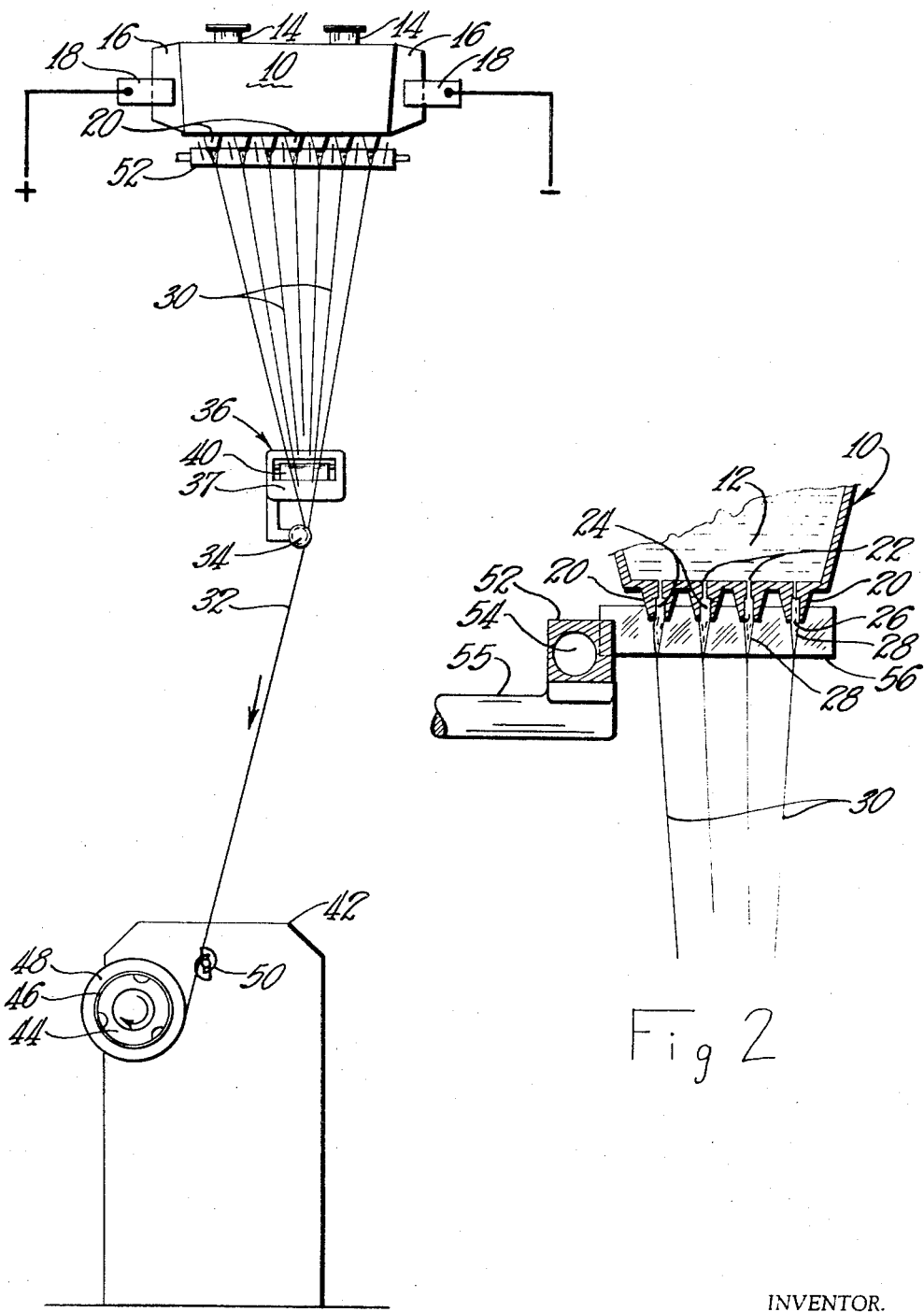
FIGURE 1 is a semischematic side elevational view of a stream feeder and cone shield construction in association with a winding machine for the production of continuous glass fibers.
FIGURE 2 is an enlarged fragmentary section view of a portion of the stream feeder and cone shield arrangement.

Referring to the drawings and particularly to FIGURE 1 there is illustrated a stream feeder or bushing 10 providing a chamber 12 containing heat-softened glass. The stream feeder 10, as illustrated, is adapted to reduce glass to a molten condition, the feeder being equipped with tubular members 14 through which glass, preferably in the form of marbles, is introduced into the chamber provided by the feeder. The feeder is fashioned with terminal lugs 16 for connection with the current conductors or bus bars 18 connected with a source of electric current for flowing current through the feeder to maintain the glass in a heat-softened or flowable condition.

It is to be understood that the stream feeder 10 may be associated with a forehearth of a glass melting furnace and receive molten glass from the forehearth. The floor of the stream feeder is provided with a plurality of depending projections 20, each of the projections being fashioned with a glass flow passage 22 through which glass flows to form the streams. As shown in FIGURE 2, each of the projections is provided with a counterbore 24 defining an orifice or outlet 26 for the glass. It is to be understood that the passages 22 may, if desired, extend through the projections without the counterbores 24.

The glass stream at the region of its delivery from each projection is in the form of a cone 28. Heat is transferred or conveyed away from the cones of glass in a manner hereinafter described to increase the viscosity of the glass for successful attenuation.

The glass of the cones 28 is attenuated to continuous filaments 30 which are converged into a strand 32 by a gathering member or shoe 34. Disposed above the gathering shoe is an applicator 36 comprising a reservoir chamber 37 containing a size or coating material and applicator member 40. The member 40 may be a movable endless belt partially immersed in the size or coating in the reservoir 37 to transfer a film of the sizing or coating onto the filaments 30 by wiping engagement.

A winding machine 42 of conventional construction is provided with a rotatable mandrel 44 rotated by a motor (not shown). A packaging or thin-walled forming tube 46 is telescoped onto the mandrel and the strand 32 would upon the rotating tube to form a strand package 48, the winding of the strand upon the packaging tube attenuating the glass streams to filaments. A rotatable and reciprocable oscillator traverse 50, which may be of the character shown in Beach Patent 2,391,870, is provided for crossing the individual convolutions of strand as the strand is wound into the package.

The fin shield or cone shield arrangement for conveying away heat from the cones 28 of glass is particularly illustrated in FIGURES 2, 3 and 4. The depending orificed projections 20 are arranged in rows transversely of the stream feeder 10. The arrangement includes a member, header or manifold 52 which is of hollow configuration providing a manifold chamber of fluid passage 54. The header or manifold 52 is disposed laterally with respect to the feeder structure and parallel thereto.

The header 52 is fashioned with lengthwise spaced slots each adapted to receive the end region of a plate-like fin or cone shield 56. The fins 56 are brazed or otherwise secured in the slots in the header or member 52.

The fin shield unit or assembly of manifold and fin shields is particularly illustarted in FIGURE 3, a fin shield or cone shield 56 being disposed between rows of streams of glass flowing from the orifices. As shown in FIGURE 3, two transverse rows of orificed projections are arranged between adjacent fin shields. The manifold chamber 54 is provided with inlet and outlet tubes 58 and 59 whereby water or other coolant fluid is supplied and removed from the header through the tubes. Water or other coolant fluid is fed into one end of the manifold chamber 54 and flows through the chamber and is emitted from the outlet end at a somewhat higher temperature due to the heat absorbed from the fins or cone shields 56.

The fins or cone shields 56 are made as thin as practicable to provide for close spacing of the rows of projections and may be of a thickness of from .015″ to .060″ or more depending upon the particular spacing of the streams flowing from the orificed projections 20. Cone shields or fin shields of this general character are disclosed in the Russell Patent 2,908,036 and the shields that have been heretofore used have been fashioned of copper or silver without any surfacing layer or plating. Copper or silver is preferred because of comparatively high thermal conductivity characteristics.

Many difficulties have been encountered in the use of fins fashioned of copper or silver without a surfacing layer or plating of a dissimilar metal. It is found that in the event of contact of a copper fin or a silver fin with an intensely hot projection of the platinum alloy feeder, the copper or silver contaminates or alloys with the platinum, resulting in damage to the stream feeder or bushing. The liability of contact of the fins with the projections arises by reason of the growth of the deposit of volatiles from the glass and the necessity for periodic cleaning of the fins to remove the accumulation or deposit of foreign matter. The volatiles adhere tenaciously to the copper or silver cone shields or fins which cannot be removed by simple water washing.

In comparatively short periods of time, the attenuating operation must be interrupted to enable the operator to remove the manifold and fin assembly from its mounting and clean the fins by brushing and cleaning liquids. The fin shield assembly is replaced while the stream feeder or bushing is at a comparatively high temperature. Considerable skill is required for an operator to reposition the fin shield assembly and avoid contact with the fins with the projections or the glass streams.

The invention comprehends or embraces a fin construction wherein a substrate metal, such as copper or silver, is coated, plated, or enshrouded with a dissimilar metal which on contact with the platinum alloy feeder or projections does not damage or contaminate the platinum alloy.

It has been found that a coating, plate or layer of nickel on a cone shield or fin of copper or silver secures the desired advantages. It is found that a surface layer or plating of nickel on contact with an intensely hot projection on the platinum alloy feeder does not contaminate or alloy with the platinum.

It is further found that the rate of accumulation of volatiles on the surface of nickel is substantially less than the rate of accumulation of such volatiles or foreign matter upon fin shields having exposed surfaces of copper or silver. Furthermore the accumulation of such foreign matter on the nickel coating or plating of a fin shield is of a character that it can be readily washed off by water sprayed directly upon the fin shields without removing the fin shield assembly and without damage or impairment of the bushing or the nickel surface.

As the volatiles from the glass accumulates at a much slower rate on the nickel surface than on exposed surfaces of copper or silver, the fin shields remain in a substantially clean and usable condition for greater periods of time and hence do not require frequent cleaning. As the nickel surfaces of the fin shields may be cleaned by water washing without disturbing the relationship between the fin shields and the projections on the stream feeder, the liability of contact of the fin shields with the projections during a cleaning operation is practically eliminated, but if contact does occur, the stream feeder will not be damaged. The nickel surface is not affected by the high temperature of the heat-softened glass as the nickel has a fusing temperature much higher than either copper or silver.

A coating, layer or plating 60 of nickel on the substrate core 62 of copper or silver should be comparatively thin, of a thickness of from .0005" to .0025" providing an effective nickel surface or coating on the substrate metal or core. The nickel coating may be provided by the conventional electroplating method or by conventional electroless method of plating metals with nickel, the electroless method involving immersion plating wherein a chemical reducing agent effects a change from metal ions to metal.

However, electroplating is preferred in order to secure a coating of pure nickel on the copper or silver cone shield. It is preferable to coat or plate the assembly of cone or fin shields and the manifold member 52 so that the region of brazing the shields to the member 52 will be coated or plated with nickel. By reason of the nickel coating or plating on the substrate metal viz. copper or silver, the orificed projections 20 on the feeder 10 may be disposed in closer relation than heretofore possible as inadvertent contact of the nickel surface, a fin shield or cone shield with a projection dos not damage the projection. The nickel plated or nickel clad fin shields may be readily cleaned by directing water sprays into the shields without modifying the temperature of the stream feeder or bushing and without disturbing the positioning of the fin shield and manifold assembly. Hence the number of "down times" or interruptions of the fiber-forming operation has been reduced and cleaning of the nickel plated fin shields by water spray is accomplished in a minimum of time.

While the thermal conductivity characteristic of nickel is less than that of copper or silver, the coating or plating of nickel is comparatively thin and does not appreciably retard or impede heat absorption or heat transfer from the glass to the substrate metal, viz. copper or silver of the cone or fin shields.

It is apparent that, within the scope of the invention, modifications and different arrangements may be made other than as herein disclosed, and the preesnt disclosure is illustrative merely, the invention comprehending all variations thereof.

I claim:
1. Apparatus for producing glass filaments comprising a stream feeder for feeding molten glass having a stream flow section provided with groups of orifices wherein a stream of glass is emitted from each orifice, means for attenuating the streams to fine continuous filaments, a plurality of fin members of metal spaced from the feeder and supported adjacent the groups of streams, means in engagement with the fin members having a passage through which flows heat absorbing fluid in heat-transferring relation with said fin members for transferring heat away from the glass streams, and a plating of nickel on the fin members.

2. The combination according to claim 1 wherein the means having a passage is tubular and has a plating of nickel thereon.

3. The combination according to claim 1 wherein the plating is electrolytic nickel.

4. The combination according to claim 1 wherein the plating is electroless nickel.

5. Apparatus for producing glass filaments comprising a stream feeder for feeding molten glass having projections depending therefrom, said projections being arranged in rows and each having an orifice therein from which a stream of glass is emitted, means for attenuating the streams to fine continuous filaments, means including a plurality of fin members arranged in side-by-side relation spaced from the feeder and supported between pairs of rows of glass streams, a tubular metal member in heat-transferring communication with the plurality of fin members through which flows heat absorbing fluid for trans-transferring communication with the plurality of fin members being of metal selected from the group comprising copper and silver, and a plating of nickel on each of the fin members.

6. The combination according to claim 5 wherein the plating of nickel is of a thickness in a range of from one half thousandth of an inch to two and one half thousandths of an inch.

7. The combination according to claim 5 wherein the tubular member is of a metal selected from the group comprising copper and silver, and a plating of nickel on the tubular member.

8. Apparatus for producing glass filaments comprising a stream feeder for feeding molten glass having projections depending therefrom, said projections being arranged in rows and each having an orifice therein from which a stream of glass is emitted, means for attenuating the streams to fine continuous filaments, a plurality of fin members spaced from the feeder and supported between pairs of rows of glass streams, tubular means engaging the plurality of fin members through which flows heat absorbing fluid for transferring heat away from the glass streams, said fin members and tubular means being of metal having comparatively high thermal conductivity characteristics, and a coating of nickel on said fin members and said tubular means.

9. Apparatus for producing glass filaments comprising a stream feeder for feeding molten glass having a surface provided with orifices arranged in rows wherein a stream of glass is emitted from each orifice, means for attenuating the streams to fine continuous filaments, a plurality of elongate members supported adjacent the rows of streams, means in heat-transferring relation with the plurality of elongate members having a passage through which flows heat absorbing fluid for transferring heat away from the glass streams, said elongate members being of nonferrous metal, a coating on the elongate members, said coating being nickel and being of such thinness as not to impede transfer of heat from the streams of glass to the elongate members.

10. The combination according to claim 9 wherein the means in heat-transferring relation with the elongate members is a tubular body of nonferrous metal, said body having a coating of nickel.

References Cited
UNITED STATES PATENTS

| | | | |
|---|---|---|---|
| 3,048,640 | 8/1962 | Glaser | 65—2 |
| 3,070,982 | 1/1963 | McGowan | 65—374 |
| 3,155,476 | 11/1964 | Drummond | 65—2 X |

S. LEON BASHORE, Primary Examiner

ROBERT L. LINDSAY, JR., Assistant Examiner

U.S. Cl. X.R.
65—1, 374